Feb. 20, 1962   J. OUIMET ET AL   3,021,913
AUTOMOBILE TRANSMISSION LEVER LOCKING DEVICE
Filed July 25, 1960   2 Sheets-Sheet 1
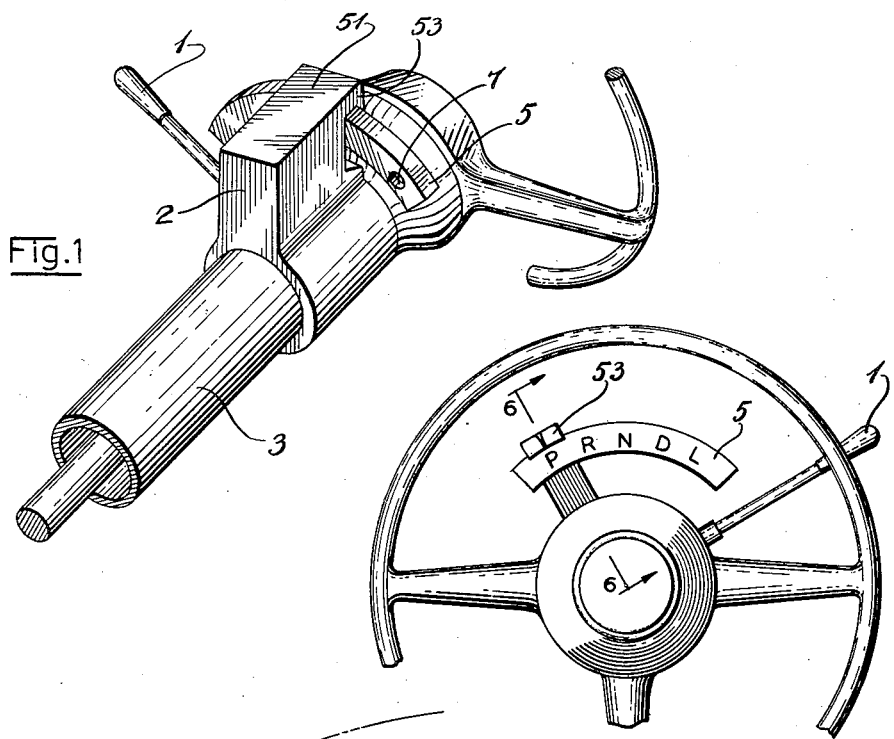
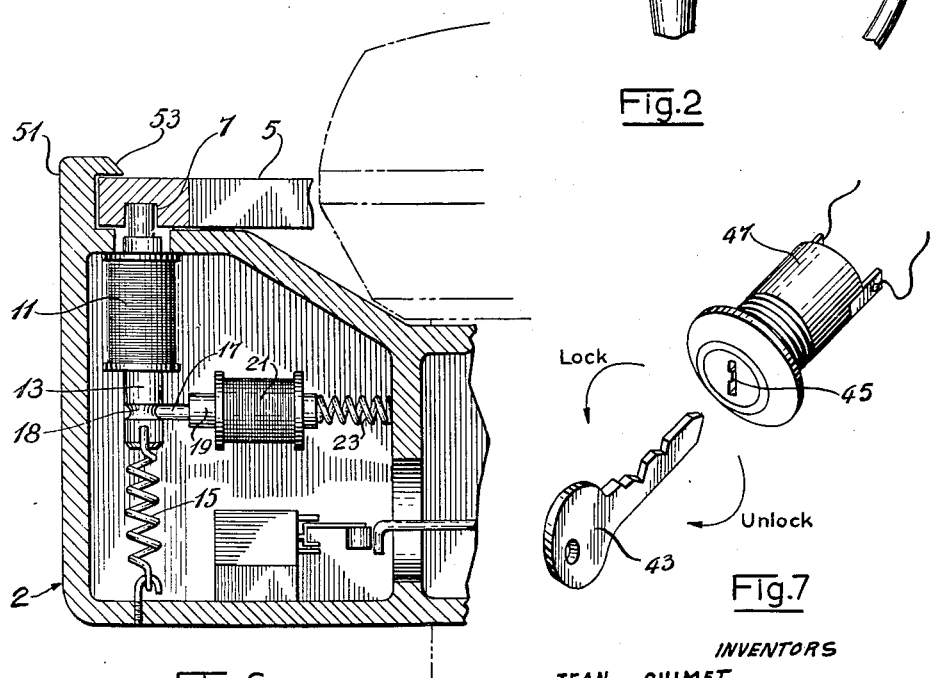
INVENTORS
JEAN OUIMET
BERNARD DANSEREAU
By *Oleic H. Bastien*
Attorneys

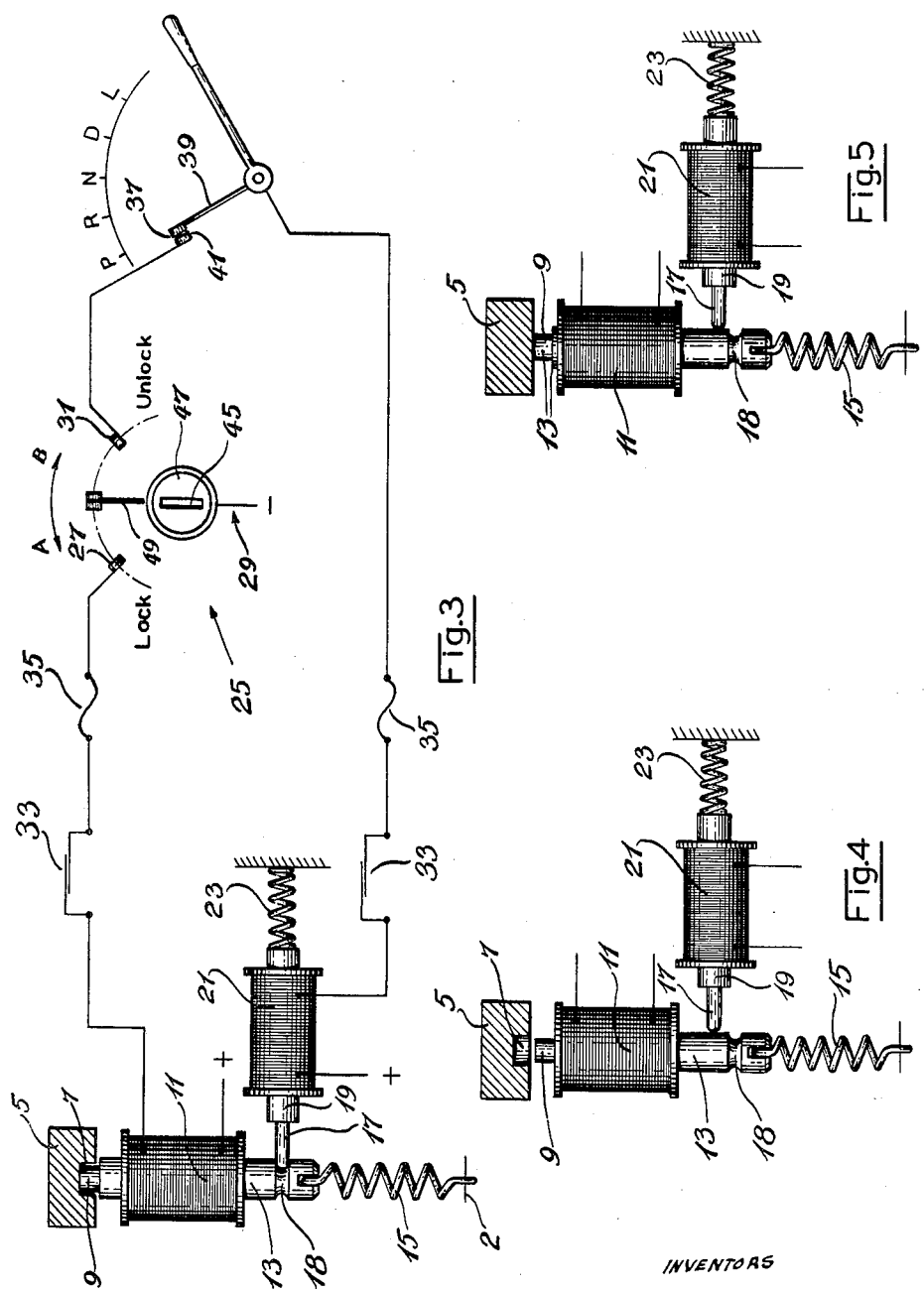

United States Patent Office 3,021,913
Patented Feb. 20, 1962

3,021,913
AUTOMOBILE TRANSMISSION LEVER
LOCKING DEVICE
Jean Ouimet, 6327 St. Andre St., and Bernard Dansereau, 12200 Jasmin St., both of Montreal, Quebec, Canada
Filed July 25, 1960, Ser. No. 45,116
1 Claim. (Cl. 180—82)

This invention pertains to a device permitting the locking and unlocking of transmission mechanism, particularly the locking and unlocking of the transmission lever of an automobile.

An object of the invention lies in the provision of a device which will prevent unauthorized use and theft of an automobile by locking the transmission selection lever when the latter is in parking position.

Another object of the invention consists in providing a locking and unlocking mechanism for the transmission lever of an automobile which can be operated without the use of any special keys but simply by employing the ignition key.

The invention further contemplates to provide a device of the aforesaid type which is extremely simple in manufacture and in operation so as to be safe, and easy to repair. Further, the device of the invention occupies very little space.

These various objects are attained by the provision, in an automobile having a transmission selection lever which can be shifted to a plurality of positions, of a combination which comprises a housing to which the said lever is secured; a member in close proximity to said housing; said housing being movable in relation to said member; a recess in said member; a spring pressed plunger engageable in said recess in one position of said lever and housing, and means to retract said plunger out of said recess to move said lever and housing in another transmission position.

A better understanding of the invention will be had with the following description, having reference to the annexed drawings wherein:

FIG. 1 shows a rear elevational view of the steering assembly of an automobile,

FIG. 2 is a front view of the assembly of FIG. 1,

FIG. 3 illustrates the electrical circuit of the locking device,

FIGS. 4 and 5 show two different views of the interlocking solenoid assemblies,

FIG. 6 is a cross-sectional view of the housing containing part of the locking arrangement and taken along line 6—6 of FIG. 2 while, FIG. 7 shows the lock and ignition switch.

The principle of the invention is well depicted in FIGS. 1 and 2, which show the invention as applied to the automatic transmission of an automobile.

As will readily be understood, a housing 2, rotatable in relation to the steering column 3 has, fixed thereto, a transmission selection lever 1 so that every movement of the latter is integrally communicated to the former. Housing 2 moves in relation to a member 5 fixed to the steering assembly.

As shown in FIG. 2, this fixed member 5 bears, on its frontal surface, a series of letters indicating the actual position of the transmission lever 1, such as P for Parking, R for Reverse, etc.

Behind member 5 is located a blind hole or cylindrical recess 7. It will be noted in FIG. 2, that the lever is in Parking position. In this position, and when the lock is operated, a plunger enters the recess and thus locks the housing, and consequently, the lever and transmission in Parking position. When released, the lever is free to move into any other position; there being but one recess into which the plunger can be projected. Housing 2 carries the necessary mechanism to obtain this operation.

The mechanism permitting the locking of housing 2 and lever 1 in relation to member 5 is better seen and understood from FIGS. 3, 4, 5 and 6.

The actual locking of the said members is provided by a plunger 9 which is the end portion of a core 13 movable in a solenoid 11. End portion of plunger 9 is, preferably of reduced diameter. Energization of solenoid 11 moves plunger 9 upwardly against the action of a return spring 15, attached to the other end of the core 13 and to housing 2 (FIG. 6).

Plunger 9 is held into recess or blind hole 7, even after solenoid 11 is de-energized by the projection of a pin 17, having a circular head, into a peripheral annular groove 18 at the end of plunger 13 away from plunger 9; said groove also having a circular inner surface to mate with the circular head of pin 17, although this feature is not necessary, but preferred. It will be noticed that the solenoids are angularly disposed, in relation to one another, preferably at 90°. Pin 17, similarly to plunger 13, is the reduced-diameter end of a core 19 of a further solenoid 21. Core 19 is forwardly pressed by compression spring 23, also held at one end to housing 2 and at the other to plunger 19, so that it is constantly biased against the outer surface of core 13 or in groove 19.

Each of said solenoids belong to a separate electric circuit. Solenoid 11 has one lead connected to the auto battery whereas the other lead is connected to the lock pole 27 of lock and ignition switch 25. This locking electric circuit is completed by throwing a lead between the battery and central connection 29 of switch 25.

Similarly, solenoid 21 belongs to a series unlocking electric circuit by being connected to the battery, on the one hand, and the unlock pole 31 of switch 25. As shown in FIG. 3, central connection 29 by being joined to the battery, completes the unlocking circuit. It is seen that connection 29 is common to both circuits.

The usual protection components, thermoswitches 33 and fuses 35, are also present in the circuits.

Finally, a further switch 37 is included in the unlocking circuit. This switch is actuated by lever 1 and closes only when housing 2 is in Parking position. The mechanical actuation and components of switch 37 comprise an arm 39, rigidly held onto lever 1, one end of which makes a mechanical and electrical contact with a pole 41, in any known manner, whenever lever 1 is pushed to Parking position. As soon as lever 1 moves out of that position, the unlock circuit is broken.

Whenever a key 43 (FIG. 7) is inserted into key slot 45 of ignition switch 25 and cylinder 47 is rotated, a radial arm 49 (FIG. 3) follows suit and moves in contact with either of poles 27 or 31.

Operation of the locking and unlocking device is as follows:

The motor is idling with lever 1 in Neutral position, with the ignition on and arm 49 turned clockwise in contact with pole 31. The unlocking circuit is open, since arm 39 does not contact pole 41 of switch 37. Both cores 11 and 21 are not energized and the respective position of their cores is similar to that shown in FIG. 4; core 13 being pulled down under the influence of return spring 15 and pin 17 being pushed laterally outwardly of coil 21 under the action of compression spring 23 and out of engagement with groove 18. The only exception is that blind hole 7 is not in alignment with plunger 9.

To lock the lever, it is first necessary to move it to Parking position, thus closing switch 37. The respective position of the cores is exactly that of FIG. 4, with hole 7 and plunger 9 in alignment. The key is turned counterclockwise. As soon as arm 49 contacts pole 27, coil 11 becomes energized and plunger 9 moves into blind hole 7. In so doing, pin 17 becomes in alignment with, and moves into groove 18 to lock plunger 9 into position under the impulse of spring 23. Even after the ignition key is taken out, the parts will remain in the locked engagement of FIG. 3.

When the key is, later, turned clockwise so that arm 49 contacts pole 31, coil 21 becomes energized and pin 17 retracts from groove 18; coil 11, not being energized, plunger 9 moves out of hole 7 under the influence of return spring 15. The situation is again that of FIG. 4 and lever 1 can be moved to the other positions.

Should coil 11 become energized while lever 1 is not in Parking position, the situation will be as shown in FIG. 5 where plunger 9 abuts the undersurface of member 5 but can go no further. This position is short of bringing pin 17 and groove 18 in alignment, so that locking of lever 1 is prevented.

It will be appreciated that the foregoing arrangement is applicable to both automatic and standard transmissions as it depends only on the relative positions of a transmission selection lever 1 and a blind hole 7 of a cooperating member 5. These conditions can be met in both types of transmissions.

Finally, in order to provide additional safety against theft and other unauthorized use of the car, housing 2 is provided with an extension 51 (FIG. 6) to its top surface which terminates in a downwardly directed pointer 53, both of which are integral with housing 2. Pointer 53 overlaps the front surface of member 5 so that it becomes impossible to tamper with housing 2.

We claim:

In an automobile having a transmission selection lever shiftable from one position to another, the locking combination therefor comprising; a housing rigidly secured to said lever so as to be movable therewith; a member in close proximity to said housing; said housing being movable in relation to said member; a recess in said member facing said housing; a plunger in said housing engageable into said recess in one predetermined position of the housing so as to lock said housing and member together; a first electrical circuit containing a first coil and a second electrical circuit containing a second coil; said circuits having a common point connected to a key operated switch alternatively closing said first and second circuits; a core in said first coil, one end of which is the aforesaid plunger, the other end being provided with a groove; a core in said second coil, one end of which is a pin movable in said groove when the plunger is engaged into the recess in locking engagement; said second core being spring pressed radially against said first core; energization of said first coil moving said plunger into said recess while energization of the second coil moves said pin out of engagement with said plunger; said key-operated switch further having a neutral position wherein both said circuits are opened; said second circuit including a further switch operated by said lever and closing said second circuit only when said lever has reached said predetermined position.

References Cited in the file of this patent
UNITED STATES PATENTS

| | | |
|---|---|---|
| 1,261,226 | Gilbough | Apr. 2, 1918 |
| 2,765,648 | Hatcher | Oct. 9, 1956 |
| 2,913,066 | Leslie et al. | Nov. 17, 1959 |